United States Patent [19]

Gentili et al.

[11] 4,249,253

[45] Feb. 3, 1981

[54] MEMORY WITH SELECTIVE INTERVENTION ERROR CHECKING AND CORRECTING DEVICE

[75] Inventors: Claudio Gentili, Cornaredo; Calogero Mantellina, Cerro Maggiore; Alessandro Scotti, Pregnana Milanese, all of Italy

[73] Assignee: Honeywell Information Systems Italia, Milan, Italy

[21] Appl. No.: 973,448

[22] Filed: Dec. 26, 1978

[30] Foreign Application Priority Data

Dec. 23, 1977 [IT] Italy .............................. 31170 A/77

[51] Int. Cl.$^3$ ...................... G06F 11/10; G11C 29/00
[52] U.S. Cl. ........................................ 371/38; 371/13
[58] Field of Search ................ 235/312; 364/200, 900; 371/38, 37, 13

[56] References Cited

U.S. PATENT DOCUMENTS

| | | | |
|---|---|---|---|
| 3,949,208 | 4/1976 | Carter | 235/312 |
| 4,077,565 | 3/1978 | Nibby, Jr. et al. | 235/312 |
| 4,112,502 | 9/1978 | Scheuneman | 364/900 |

OTHER PUBLICATIONS

Wolff, Main Storage Error Correction, IBM Technical Disclosure Bulletin, vol. 10, No. 10, Mar. 1968, pp. 1561-1562.

Primary Examiner—Charles E. Atkinson
Attorney, Agent, or Firm—Finnegan, Henderson, Farabow, Garrett & Dunner

[57] ABSTRACT

A memory system wherein data is stored along with a SEC-DED error detecting and correcting code. Means are provided for selecting either a direct readout path for data from the memory when no readout errors have been detected for the memory address being accessed, or an alternate readout path including circuits for checking and correcting errors when an error condition has been detected. An auxiliary memory is provided for storing error flag bits indicating memory zones which have produced erroneous readouts, whereby the system is controlled such that high speed direct read cycles are executed for no-error memory zones and optimum memory accessing time is achieved without sacrificing the reliability achieved through use of the error correcting codes.

6 Claims, 13 Drawing Figures

MEMORY WITH SELECTIVE INTERVENTION ERROR CHECKING AND CORRECTING DEVICE

BACKGROUND OF THE INVENTION

The present invention relates to main memories of data processing systems and more particularly to those memories provided with devices which improve their reliability and are capable of detecting and correcting errors caused by failure of the memory circuits. The advent of LSI semiconductor circuit technology has led to the progressive replacement of magnetic core memories by semiconductor integrated circuit memories.

These devices, besides having a very low cost per stored information unit, offer the advantage of an extremely reduced size and are suitable for fabricating memories having very high storage capacities. Although the degree of reliability provided by such semiconductor circuits is high, a certain probability of failures occurring within these integrated devices either at initialization time or during operation time still exists. Such failures may influence the accuracy of information stored in or read from particular memory locations. The failure probability, while low for a single integrated device, may nonetheless become appreciable in the case of a large capacity memory comprising a considerable number of integrated devices.

This factor has led to the utilization of redundancy storage techniques in which it is possible to identify and correct errors, thus allowing effective utilization of memory devices even in the event of circuit failures that would cause erroneous writing and reading operations in a non-redundant memory. Today, among the different redundency systems commonly employed, the more convenient employ error correcting codes, the so called SEC-DED (Single Error Correction—Double Error Detection) codes are the ones most commonly used and provide detection and correction of single bit errors in the read out data and detection, but not correction, of double bit errors in the readout data.

A description of the theory on which these codes and the devices utilizing them are based, is omitted here since it is not essential for an understanding of the invention; furthermore a large amount of literature has been published, beginning with R. W. Hamming's article: "Error Detecting and Error Detecting Code," published in the Bell System Technical Journal, Vol. XXII, No. 2, April 1950.

The use of such codes requires that, in storing a binary coded data byte, the error correcting code associated with the byte must be generated and then stored in the memory along with the byte. Likewise, it is necessary, before using information read out from the memory, to process it by generating the related code and comparing it with the one already stored and read out with the information. From this comparison an error condition may result which, through a correction network, leads, if necessary, to the correction of the readout information. These operations of correction code generation, correction code regeneration on readout, comparison, and correction, if necessary, are performed by means of logical circuits which have a certain, non-negligible intervention time.

In the case of error code generation during a write operation in memory, the generation time and the time required for memory addressing may overlap, consequently no delay is added. However, in the case of error code regeneration and comparison during a read operation, the necessary functions can be performed only after the reading has been completed, whereupon the validation process imposes a certain delay time on memory readout operations. This delay may greatly hamper memory performance. Furthermore it is foreseen that in the future, with the advent of bipolar LSI integrated circuits which are intrinsically much faster than integrated circuits of the MOS type, which have been preferred for their high level of integration, the validation delay will become, as a percentage of readout time, even more detrimental.

SUMMARY OF THE INVENTION

This shortcoming is overcome by the present invention in which the memory employs error checking and correcting means which function with selective intervention. In accordance with the invention, the circuits utilized for error code generation, error comparison, and correction intervene during a memory read cycle when error-affected memory zones are addressed but in all other cases the validation circuits do not intervene and transfer of the readout information is performed at the maximum operating speed allowed by the memory circuits. This means that the operating speed of the memory will vary depending on the presence or absence of error.

Thus in accordance with this aspect of the invention, the memory is provided with timing and control circuits which modify the duration of a memory cycle depending on the presence or absence of error and further includes an auxiliary memory or "directory" which stores, for each memory zone, an indication of whether or not an error has been detected in that zone.

The partitioning of the memory into zones can be achieved according to the most suitable criteria and in relation to the nature and the extent of the most probable faults and their subsequent error results. Means are therefore needed for determining which memory zones are affected by errors. This can be done by testing the whole memory at initialization time, however, in such a case it would not be possible to take into account errors that may occur during operation.

Therefore according to another aspect of the present invention the readout information is systematically checked after each read operation and if an error is detected a new reading of the same information is commanded followed by a validation and correction operation. These and other aspects of the present invention together with the features and advantages thereof will become apparent from the following description of a preferred embodiment when read in conjunction with the attached drawings.

DETAILED DESCRIPTION OF THE PREFERRED EMBODIMENT

Figure 1:
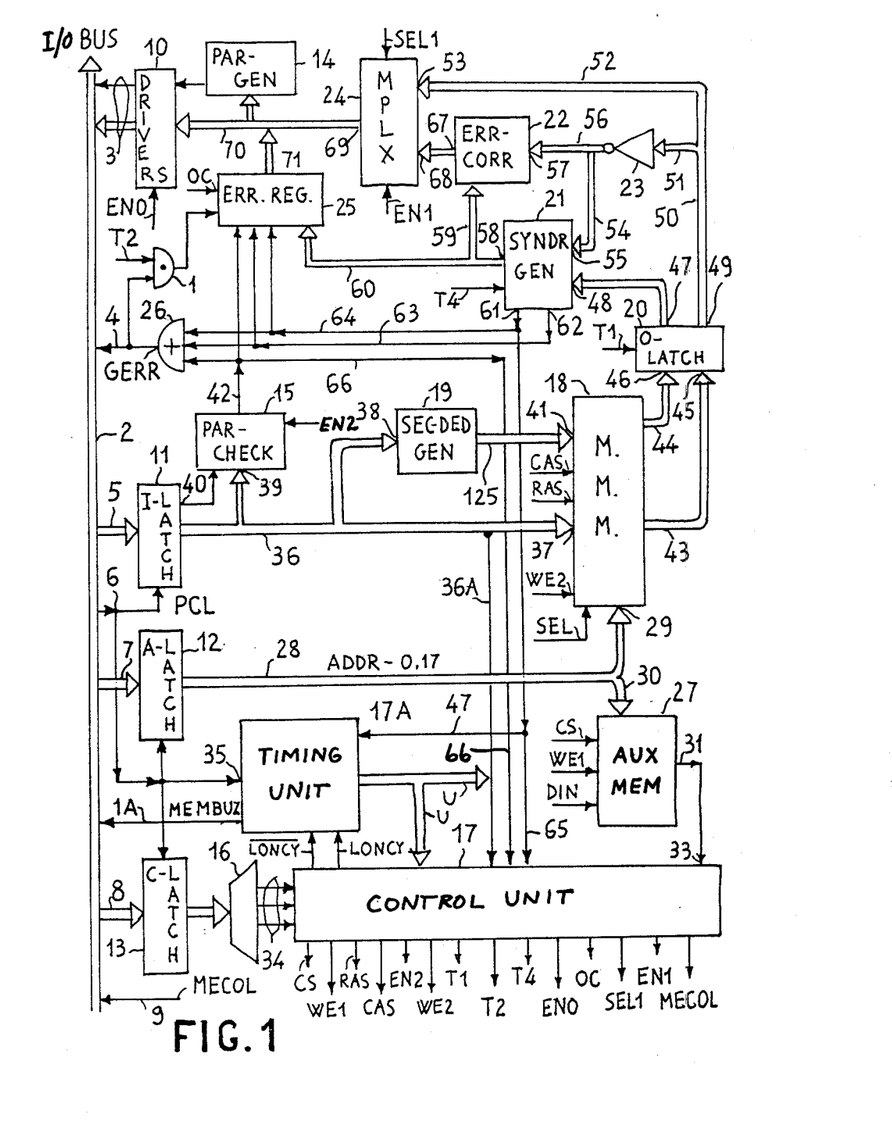
FIG. 1 is a schematic diagram illustrating a preferred embodiment of a memory system organized according to the invention.

FIG. 1 schematically shows a memory system provided, according to the invention, with a selective intervention error detection and correction device and organized to employ 8 bit parallelism. It should be noted that the use of redundancy codes of the SEC-DED type (i.e. single error correction and double error detection) is performed preferably by means of higher memory parallelism (e.g. 32 bits) to increase the information/redundancy bit ratio. In fact, a SEC-DED code requires, for an eight bit data group, five additional redundancy bits whereas, in the case of information in 32 bit groups, the additional code required is only seven bits.

Data transfer between the memory and the central processing unit (not shown), or between the memory and other equipments in the system, is implemented via a channel or I/O bus 2 consisting of a set of lines. As shown in FIG. 1, the lines of bus 2 may include nine wire set 3 used to transfer an 8 bit data readout from the memory accompanied by a check bit; a line 4 for transferring general error signal GERR generated by the memory; nine wire set 5 for transferring 8 bit data bytes to be stored in memory, accompanied by a check bit; a line 6 for transferring to the memory a PCL signal to start a memory cycle; a set of lines 7 to transfer into memory a binary code for memory addressing.

The number of lines in cable 7 depends on the memory capacity, that is, on the number of addressable memory locations. Assuming that there are 256,000 addressable memory locations, 18 lines are required to transfer an 18 bit address code.

I/O bus 2 further includes a set of lines 8 to transfer to memory a suitable number of binary encoded command signals. This command information specifies, for example, whether the memory is to perform a read or write cycle, or test/diagnostic cycles, etc. Bus 2 further includes a set of lines to transfer from the memory to the system a number of timed status signals generated by the memory itself. In the embodiment of FIG. 1 only two lines, 1A and 9 are shown for the transmission of the MEMBUZ and MECOL status signals, respectively, the meaning of which will be explained later.

The memory system generally comprises a set of driving circuits 10 to drive the lines 3, an I-LATCH register 11 for loading input data presented on lines 5, an A-LATCH register 12 for loading memory address data presented on lines 7, which are connected to the inputs of said register, and a C-LATCH register 13 for loading command information received via lines 8, which are connected to the inputs of said register.

The memory system further includes a lateral parity bit generation network 14 (PAR-GEN) to generate a parity bit for the information read from memory unit 18, a parity checking network 15 (PAR CHECK) for checking the parity of information received for storage in the memory, a decoder 16 for decoding command information supplied from C-LATCH 13, a timing unit 17A, and a control unit 17.

The memory system further includes a data storage unit 18 designated M.M.M. (Main Memory Module), a Hamming or SEC-DED redundancy code generation network 19 (SEC-DED GEN) for generating a SEC-DED code related to the information to be stored in the main memory module, an O-Latch register 20 for storing information read from the memory module, a SYN-DRONE GEN network 21 for comparing and generating error signals, an error correction network 22 (ERR-CORR), a set 23 of inverter/driver circuits for feeding data from O-LATCH 20 to correction network 22, a multiplexer circuit 24 (MPLX), an error signal register 25 (ERR REG), an OR circuit 26 for generating the general error signal GERR, and an auxiliary memory 27, also referred to as a "directory," for storing data which differentiates the memory zones affected by errors from the zones which are not affected by errors.

FIG. 1 shows also the main communication and interconnection paths between the above-mentioned blocks. To facilitate understanding of the drawing some lines used for transferring command and timing signals are not illustrated. It should be noted that the control unit 17 and timing unit 17A are provided with a certain number of output terminals identified by the name of the signal presented at the terminal. Such signals, having command or timing functionals, or both, are applied either to the input terminals of the above-mentioned memory system circuits or to the I/O bus 2. For example, the MECOL signal is sent to the central processor by means of line 9 and bus 2, the CS signal is applied to the input of the directory module 27 along with WE1 and DIN, the CAS signal is applied to the input of memory module 18 along with RAS and WE2, the SEL1 and EN1 signals are applied to the inputs of the multiplexer 24, and so on.

It is to be understood that since illustration of complete connecting lines between all the outputs of the control unit and the various input terminals of the memory circuits would cause confusion, only the more significant connections are illustrated as full lines. This applies also for the timing unit 17A whose outputs are connected both to the control unit and to various ones of the memory circuits. FIG. 1 shows that the outputs of A-LATCH register 12 are connected to a channel 28 consisting of 18 lines designated ADDR ) - 17 connected to the address inputs 29 of memory module 18. Ten lines of channel 28 transfer the most significant address bits via channel 30, to the address inputs of the auxiliary directory memory. Output 31 of the memory 27 is connected to input 33 of the control unit 17.

Sinilarly, the outputs of C-LATCH register 13 are connected to the inputs of decoder 16 whose outputs 34 are in turn connected to the control unit 17. Signal PCL, which activates the memory and is recieved from the central processor (not shown) is applied to enabling inputs of the I-LATCH register 11, A-LATCH register 12, and C-LATCH register 13 which are enabled by the leading edge of the PCL signal to store a binary data byte, binary address, and a command signal, respectively. PCL is also channelled to an input 35 of the timing unit 17A. The outputs of the I-LATCH register 11 are connected, except for output 40, through channel 36, which in the preferred embodiment has 8 lines, to the data inputs 37 of the memory module 18, as well as to the inputs 38 of the SEC-DED code generation network 19, and the inputs 39 of the parity check network 15. A line 36A of channel 36 is also connected to the control unit 17. Output 40 of the I-LATCH 11, which supplies the parity bit of the byte stored in register 11, is connected to a ninth input of PAR-CHECK network 15.

In case of inconsistency between the parity bit and the information, the network 15 provides an output line 42 a parity error signal which is applied to an input of OR circuit 26, to an input of error register 25, and through line 66, to the control unit 17.

The outputs of the SEC-DED code generation network 19 are connected through leads 125 to inputs 41 of memory module 18, so that when the module is enabled by the WE2 signal to write the information received from register 11, the related redundancy code is also written into the memory module. When the memory module is read at a selected memory address, the information contained therein, and the related redundancy code are respectively transferred through output channels 43 and 44 (in the present example having 8 and 5 lines respectively) to inputs 45, 46 of O-LATCH register 20, where the information is loaded into register 20 on occurrence of the T1 signal. Outputs 47 of register 20, corresponding to those register cells that contain the redundancy code, are connected to inputs 48 of the syndrome generation network 21. Outputs 49 of register 20, corresponding to the register cells containing the binary data readout from memory, are connected through channels 50 and 51 to the inputs of inverter drivers 23, as well as through channels 50 and 52, to inputs 53 of multiplexer 24. The outputs of the inverter/drivers are connected through channel 54 to inputs 55 of the syndrome generation network 21, and through channel 56 to the inputs 57 of the error correction network 22.

Outputs 58 of the syndrome generation network 21 are connected, through channel 59, to an equal number of inputs of the error correction network 22 and through channel 60 to an equal number of inputs of the error register 25. The syndrome generation network 21 has, besides the syndrome outputs 58, two additional outputs 61, 62 for transferring a single error signal or a double error signal, respectively. Output 62 is connected through lead 63 to an input of error register 25 as well as to OR circuit 26. Output 61 is connected through lead 64 to an input of error register 25 as well as to OR circuit 26. Output 61 is also connected through lead 65 to an input of control unit 17 and, through line 47 to an input of timing unit 17A.

The error correction network 22 has an 8-bit output line 67 connected to an input 68 of multiplexer 24. The multiplexer circuit 24 is enabled to transfer on its output 69 the information present either at input 53 or at input 68, depending on whether the SEL 1 signal applied to a selection input is at logic level 1 or at logic level 0 and, in any case, on the presence of an EN1 enabling signal. Otherwise, the outputs 69 are set in a high impedance state.

Outputs 69 are connected to the output channel 70, which also carries the outputs from error register 25. The error register is set by a T2 pulse received through AND gate 1, if AND gate 1 is enabled by the general error signal GERR. The outputs of register 25 are enabled by an OC signal, otherwise they display a high impedance state.

Collector channel 70 is connected to the inputs of the parity generating circuit 14 and to the inputs of the driver circuits 10, which transfer to I/O bus 2 the information present on channel 70 along with the related parity bit from parity generator 14, when the drivers 10 are enabled by an ENO signal.

Before considering further structural details of the memory system of the present invention, it is useful to mention some significant aspects of the circuits that have already been described. It will be noted that at the end of a memory readout cycle, the binary information read out from memory and loaded into O-LATCH register 20 may follow two different paths in order to reach the driver circuits 10 and, thereafter, the I/O bus 2 connecting the memory to the system. A direct path is provided by channels 50, 52 and by channel 70 with the sole interposition of multiplexer circuit 24. The other path is provided by channels 50, 51, 56, 70 with the interposition of the inverter/driver circuits 23, the error correction network 22, and the multiplexer circuit 24.

It should also be noted that the error correction network supplies a correct output only if concurrently with the information it received via channel 56 the appropriate error syndromes are supplied via channel 59 from the syndrome generation network 21, which in turn, in order to operate correctly, must be receiving at its input the information to be checked which is received from the driver output 23 through channel 54. It is therefore clear that the second path (which paths will be designated as "control paths") is considerably slower than the first path, including the direct channels 50, 52. Even if high speed circuits are used for elements 21, 22, and 23 the resulting delay is in the order of 50 nanoseconds.

The provision of two data transfer paths between the memory module output and the I/O bus represents one aspect of the present invention. If data which is affected by error is to be transferred, it is possible to select the path which provides error detection and correction, even if such path is slower. On the contrary, if the information to be transferred is correct, the faster path may be sleected. It is therefore necessary for the control and timing units to provide different sets of timing and control signals for the two different types of memory readout cycles. The auxiliary memory, or directory, 27 which is another aspect of the present invention, is the key factor for determining which path will be followed during a given readout cycle.

FIG. 1 shows that data to be written in memory is checked by the parity control network 15 immediately before the writing operation takes place. As explained subsequently, when a parity error is detected during a write cycle, the write cycle is modified in order to avoid writing incorrect information into memory. In other words the parity control network 15 ensures the correctness of the information written into memory. Thus, if an error is detected during a subsequent reading of the information, the error must be attributable to an intermittent or persistent error condition in the memory module itself.

Such a fault condition will have a well defined location in the memory modules. The directory 27 functions as an auxiliary memory having in the present embodiment a 1024 bit capability which permits the association of each bit of the directory 27 with a predetermined memory zone. The value of each zone bit indicates whether the associated zone is affected by error. For example, a memory having 256 K addressable locations can be subdivided into 1024 zones each having a size of 256 contiguous addressable locations and each being associated with a given memory bit in the directory 27. Each 18-bit memory address identifies a predetermined memory location, and the 10 most significant bits of the address identify the zone to which the memory location belongs and can be used to address the directory to retrieve the bit related to the addressed zone. A zone bit logic level of 1 indicates that the related zone is affected by error while the logic level 0 indicates that the zone presumably is not affected by error.

Therefore as soon as a memory location is addressed, a directory location is simultaneously addressed and the bit stored in that location is readout. The readout bit is transferred from output 31 of memory 27 to input 33 of the control unit 17 and according to its logic value will allow unit 17 to generate control signals for establishing the readout path which must be followed to insure that correct data is supplied. The directory content may be loaded in various ways, e.g. through a memory check performed at initialization time or periodically during system operation. This procedure runs the risk of the read operation being carried out without the information being checked and corrected in those memory zones where a fault has occurred since the last check has been carried out.

It is therefore essential, and this is another aspect of the present invention, that the readout information, even if transferred to the I/O bus via the direct path, is checked in any case so that detection of an error will be signalled to the CPU. In the case of a single error, which by its nature is recoverable, such a condition is notified to the CPU while, at the same time an error indication is entered in directory 27 at the location designating the memory zone in which the current read operation is being performed. In this way the CPU can require execution of a second read cycle at the same previous address. This read operation will be performed utilizing for the transfer from the memory module to the I/O bus the check and correction path instead of the direct path so that the error will be automatically corrected.

Having thus described in broad terms the memory system of the present invention, the various circuit elements of the memory system will now be described in detail. The latch registers 11, 12, 13, 20, and 25 may be implemented with available integrated circuits such as, for example, Texas Instrument I.C. number 74LS374, which is an 8 bit register made with the TTL Schottky technology. Such registers are loaded with the leading edge of an enabling signal applied to the enabling input. PCL functions to enable registers 11, 12, 13, T1 enables register 20, and T2, as gated by GERR, enables register 25. Register 20 can be fabricated by the use in parallel of two of said integrated registers to obtain a 16 bit capacity of which only 8 + 5 bits will be actually used. Unlike register 25 the outputs of registers 11, 12, 13, 20 can be permanently enabled, therefore no output enabling signal is specifically described herein.

Decoder 16 can also be fabricated from standard integrated circuits. For example, Texas Instruments I.C. number 74LS138 is an integrated decoder with three inputs and eight outputs that decodes a 3 bit binary code in a signal present on only one of its 8 outputs. Further details relative to the register and decoder circuits have been omitted since they are not as essential for an understanding of the invention.

Insofar as the present invention is concerned, the commands received and loaded in register 13 can indicate a memory read operation RM, a memory write operation WM, a read operation RE of the error register, or an operation WD for diagnostic writing. From a general point of view other operating procedures can be foreseen, e.g., for diagnostic purposes or for combined read/write operations.

Circuit 14 which gneerates the parity bit and circuit 15 used for the parity checking can also be implemented with available integrated circuits, e.g., Motorola circuit 82S62, which consittutes a generator parity control circuit with 9 inputs. When the circuit acts as a parity bit generator, the 9th input is not used, that is, it is grounded permanently in such a way that a logical and electric zero is applied to it.

The multiplexer circuit 24 can be implemented by utilizing a convenient number of available integrated circuits such as Texas Instruments I.C. number 74LS287, which is a quadruple 2 to 1 multiplexer integrated circuit. The required parallel bit capacity, consisting of 8 pairs of inputs, can be obtained by means of two of such circuits used in parallel.

The driver circuits 10 can be built up by using in parallel three integrated circuits of the 26S 10 type, marketed by "AMD." Said circuits provide a parallel bit capacity of 12 bits, of which only 9 are actually required.

The auxiliary memory or directory 27 may comprise an integrated circuit marketed by Fairchild and made commercially available as item 93L425. More precisely, such I.C. is an isoplanar TTL memory with very short read/write access timing and a size of 1024 bit, addressable by a 10 bit address. Details regarding this circuit may be found in the technical brochures provided by the manufacturer. It need only be pointed out that such memory is provided with 10 address terminals, a memory selection input designated CS, a data input designated $D_{IN}$, a command input designated $WE_1$ that defines, accordingly to the logic level of the signal applied, the read or write operation to be carried out, and a data output desginated DOUT (corresponding to the terminal 31 shown in FIG. 1).

The memory module 18 can also be implemented by use of available integrated circuits. For instance, the Mostek company markets as item MK4116P a 6384 bit MOS memory circuit with random access control, whose inputs and outputs are compatible with standard TTL circuits. By using a convenient number of such circuits it is possible to obtain a memory for any parallel bit structure and capacity required. In the present embodiment the required 13 bit parallel structure and 256 K capacity are obtained by using 318 of these integrated circuits (13 × 16). Each circuit is provided with a data input terminal, a data output terminal, seven address terminals, a WR command input for read/write control, and two RAS, CAS timing and control inputs to indicate whether the information present on the address inptus at the time they switch into the active represents a row address or a column address. In order to address a memory position within the 16,384 bit array, a 14 bit binary address word is applied in two phases. First, 7 bits of the address are used to select a row within the 16,384 memory cells and thereafter the other 7 bits of the address are applied to the same inputs to select column position within the already selected row.

Figure 2:
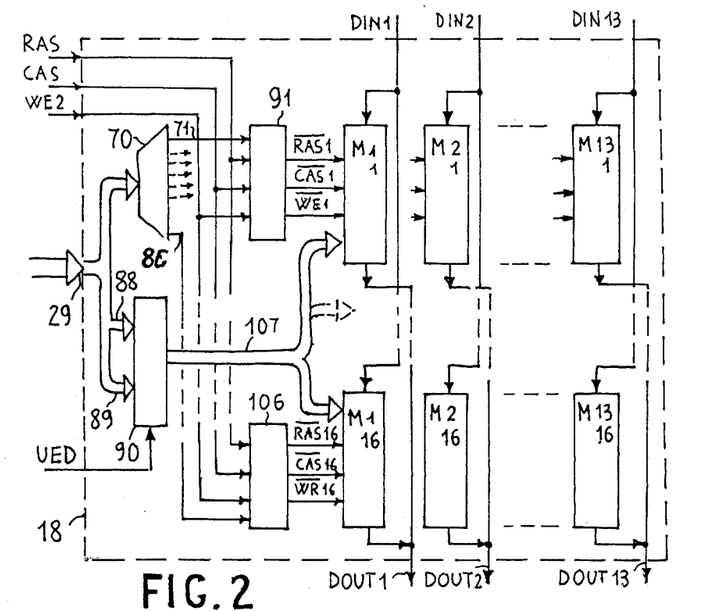
FIG. 2 is a diagram showing the organization of data storage module 18 of the memory system shown in FIG. 1.

FIG. 2 shows by way of example the organization of a memory module having a 256 K word storage capacity, each word having 13 bits. The memory circuits (318 in number) are organized in 13 columns of 16 circuit packages each. Each circuit may be referenced by an Mij designation, where i is a column index and j is a row index. The data input terminals are referenced as DINi where i is the column index and are shown as connected to the data inputs of all the circuit packages in the ith column. Each data output terminal, indicated by the designation DOUTi, where i is the column index, is connected to the outputs of all the circuits packages in the ith column.

The 18 address lines of channel 28 (FIG. 1) are applied through input 29 to the memory module 18 as also shown in FIG. 2. Here the lines used to transfer the four most significant address bits are connected to the inputs of a 4-input-to-6-output decoder 70 (similar to the decoder 16). A 4-bit code applied to the decoder inputs is converted into a signal present on only one of the sixteen output leads 71–86, each of which is connected to an enabling input of a corresponding set of gating circuits 91–106, of which only gates 91 and 106 are shown. Each gate comprises three AND circuits. All sixteen gates simultaneously receive the RAS, CAS and WE2 signals generated by the control unit, but are transferred to the outputs of only that gate which is enabled by the output from decoder 70.

The outputs of gates 91–106 are respectively connected to the RASi, CASi, WE2i inputs of the circuit packages of each of the sixteen rows. Therefore each row of packages M1j, M2j, . . . M13j, receives the proper operating commands only if it is selected by an enabling signal which enables the corresponding AND gate 91–106. In this way the four most significant address bits select a row of circuit packages within the memory module.

The remaining 14 bits of the address are applied through the line sets 88, 89 to a corresponding number of inputs of the multiplexer unit 90, which transfers them to output 107 depending on whether a UED selection signal is present to the selecting input. Multiplexer 90, like multiplexer 24, may comprise four integrated circuits of the T.I. 74LS257 type. The 7 outputs of multiplexer 90 are connected to the addressing inputs of all the circuit packs forming the memory module and provide for addressing first the row and then the column within the row of packs selected by the PASi, CASi, WE2i signals.

Figure 3A:
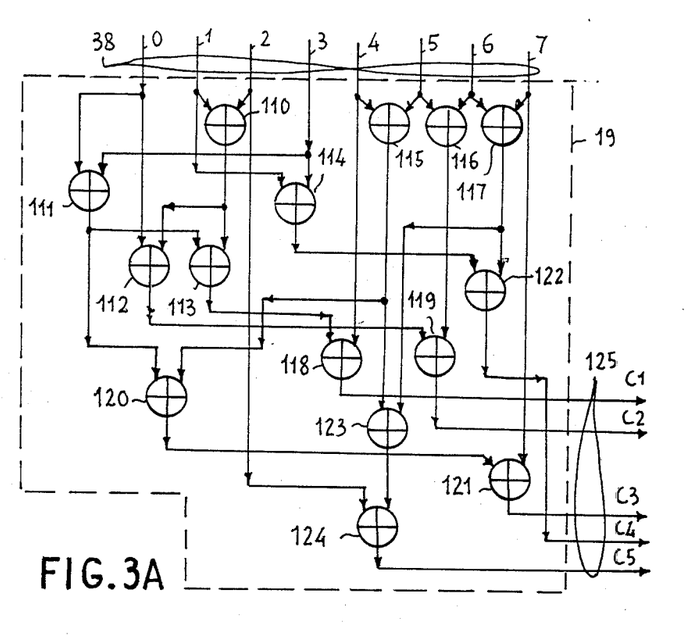
FIG. 3A is a schematic diagram of the logic circuits forming the SEC-DED code generator 19 used in the system of FIG. 1.

FIG. 3A shows in detail a preferred embodiment of the SEC-DED code generation network 19 for an 8 bit byte structure. The network is built up with EXCLUSIVE OR (XOR) circuits 110, 111, . . . 123. Without giving a detailed description of the specific interconnections between the EXOR circuits, which may be readily understood by those skilled in the art, it may be noted that such circuits form five parity bit signals C1–C5, each of which indicates the presence of a certain combination of the 8 input bits 0–7.

Figure 3B:
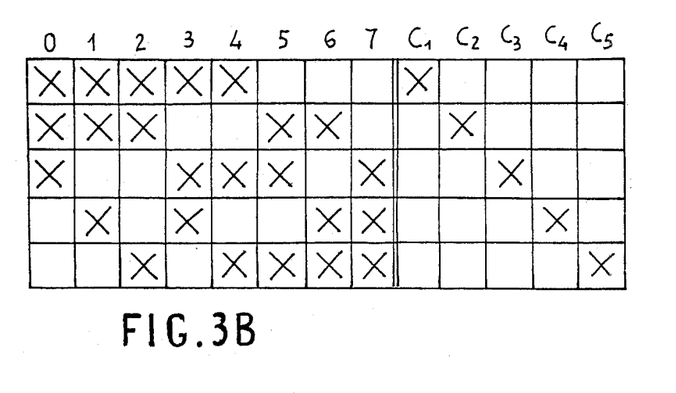
FIG. 3B is a logic table showing the relationship between various information bits and the bits constituting the SEC-DED code generated for such information.

FIG. 3B shows in table form the combination of input bits (marked with a cross) which are represented by each of the five parity bits $C_1$, $C_2$, $C_3$, $C_4$, $C_5$. In other words, the table of FIG. 3B illustrates the logical operation performed by the EXOR network of FIG. 3A. This table shows that the bits of each weight contribute in a selective mode to the generation of three parity bits for a total of five parity bits forming the error code. The SEC-DED code generated in this way is applied through the lead group 125 (FIGS. 1 and 3A) to the memory module 18 to be written therein together with the related binary data.

Figure 4:
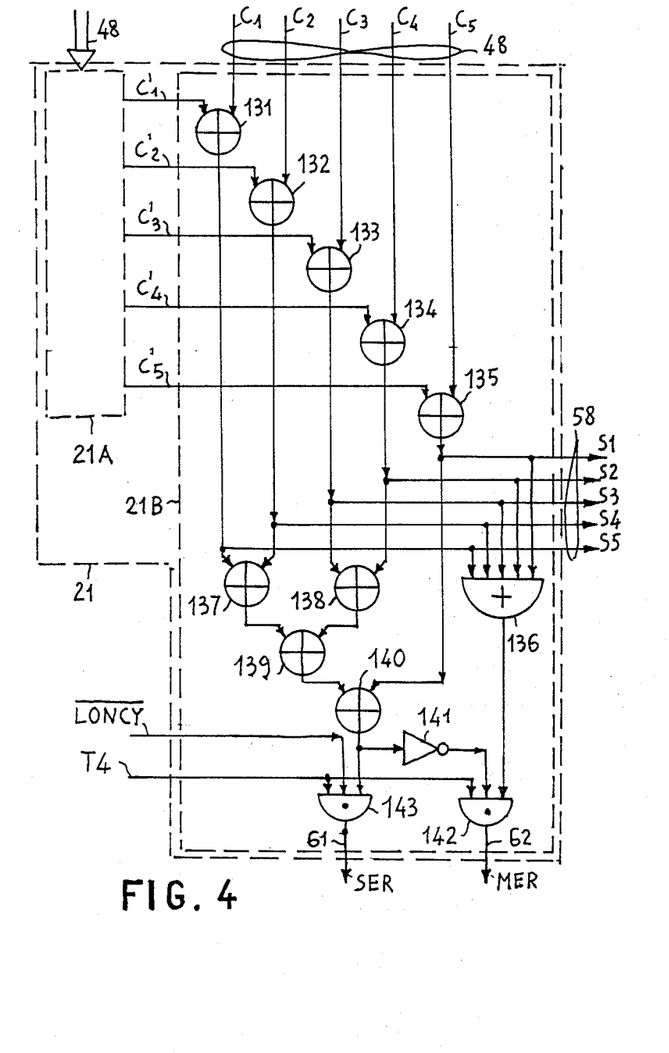
FIG. 4 is a schematic circuit diagram showing in detail the syndrome generation network 21 of the FIG. 1 memory system.

FIG. 4 shows a preferred embodiment of the syndrome generation network 21 for an 8 bit byte structure accompanied by a SEC-DED code of 5 bits. The network is formed by a first section 21A exactly like the code generation network 19 already described in connection with FIG. 3A, and by a second section 21B which operated to perform a comparison operation and which syndrome signals.

The comparison section 21B comprises exclusive OR circuits 131, 132, 133, 134, 135, each of which receives respectively one of the parity bits $C'_1$, $C'_2$, $C'_3$, $C'_4$, $C'_5$ read out directly from memory and received through inputs 48. Even parity bits $C_1$, $C_2$, $C_3$, $C_4$, $C_5$ are potentially affected by error. Outputs $s_1$, $S_2$, $S_3$, $S_4$, $S_5$ generated by the exclusive OR network are supplied on output line 58 and represent either an error symptom or a non-error indication which is herein referred to as a syndrome signal.

In a no error condition, $C'_1$ coinciding with $C_1$, $C'_2$ with $C_2$ etc., outputs $S_1$–$S_5$ will be the zero logic level whereas, in the case of an error, one or more outputs $S_1$–$S_5$ will be at the one logic level. Outputs $S_1$, $S_2$, $S_3$, $S_4$, $S_5$, are connected to the inputs of an OR circuit 136, whereupon the presence of logical level 1 at the output of OR 136 supplies an error indication. Furthermore, the table of FIG. 3B shows that when a single bit error occurs in one of the information bits from 1 to 7, the syndrome signal contains three error outputs, i.e., three of the outputs $S_1$–$S_5$ assume a "1" logic level. For instance in the case of an error occurring at bit 1, the outputs $S_5$, $S_4$, $S_3$ of the XOR circuits 131, 132, 133, which effect comparisons between $C_1$, $C'_1$; $C_2$, $C'_2$; $C_3$, $C'_3$, respectively, will assume a "1" logic level. In the case of a single bit error occurring in the stored SEC-DED code, the syndrome signal contains only a single error output. In the case of a couble bit error, the syndrome signal contains an even number of error outputs.

The observations which are apparent from an examination of tee logical table of FIG. 3B, are fully explained and illustrated by examples given in the previously mentioned Hamming article. Given that single errors are correctable and are characterized by an odd number of symptom outputs whereas double errors are uncorrectable and are characterized by an even number of symptom outputs, network 21 further comprises circuit means for discriminating among single (correctable) and double (uncorrectable) errors.

Such circuits comprise the set of XOR circuits 137, 138, 139, and 140, the inverter 141, and AND circuits 142, 143. Outputs $S_4$, $S_5$ are connected to the inputs of XOR 137 while outputs $S_3$, $S_2$ are connected to the inputs of XOR 138. The outputs of XORs 137 and 138 are connected to the inputs of the XOR 139 and the output of XOR 139 and output $S_1$ are connected to the inputs of XOR 140. Clearly, the output of XOR 140 will be at logic level "1" only if that level is present at an odd number of the outputs $S_1$, $S_2$, $S_3$, $S_4$, $S_5$. Therefore, a logic level output from XOR 14 is a single error signal.

The output from XOR 140 is connected to an input of a three input AND circuit 143. A T4 timing signal received from the control unit 17 is applied to a second input of AND 143 a LONCY signal, also received from unit 17, is applied to the third input of AND 143. LONCY, when at logic level 1, indicates that the memory cycle being run is not a long one and a single error correction operation has not been present. In this case the single error indication present at the output of XOR 140 propagates through AND 143 for the whole time interval during which the AND 143 circuit is enabled by the T4 signal.

However, if LONCY is at logic level 0, which means that during the memory cycle the correction of possible single errors is present, the single error indication is not transferred through AND 143 to output 61, but is masked.

XOR 140 is also connected through inverter 141 to the input of AND 142 which receives, at a second input, the output from OR 136. In addition, AND 142 receives the T4 timing signal at a third input. Thus, when the detected error is not a single bit error, output 62 of AND 142 shifts to logic level 1 and supplies a multiple error indication for the whole time interval during which AND 142 is enabled by T4.

The single error and multiple error signals SER and MER are applied via lines 63 and 64 to OR 26 (FIG. 1), which supplies general error signal GERR, and to a pair of inputs of error register 25. The SER single error signal at output 61 is also transferred through line 65 to the control unit 17.

Figure 5:
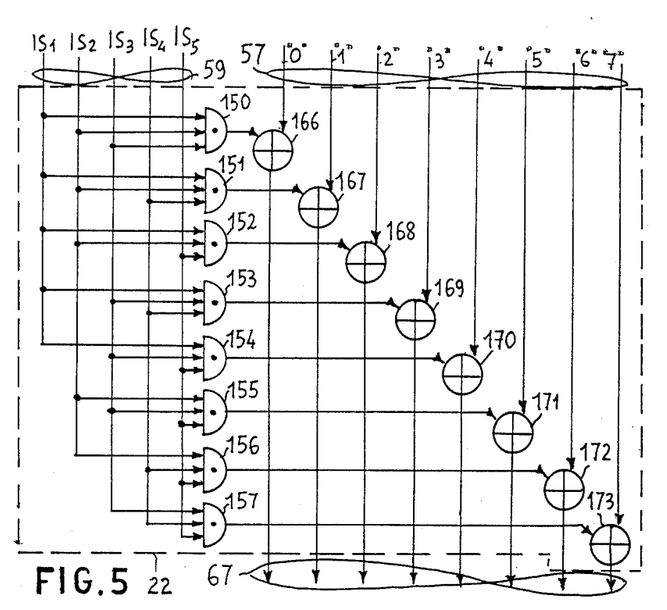
FIG. 5 is a detailed logic diagram of the error correcting network 22 shown in FIG. 1.

FIG. 5 shows in detail a preferred embodiment of the error correcting network 22 as arrayed 3 for an 8 bit byte structure. The error syndrome signal applied to inputs $IS_1$, $IS_2$, $IS_3$, $IS_4$, and $IS_5$ via channel 59 is decoded by ANDs 150-157 to supply an error indication on one out of 8 lines, the active line corresponding to the erroneous bit which is to be corrected. Decoding is carried out depending on the characteristics of the SEC-DED correcting code shown in the table of FIG. 3B. For example, an error occurring on the bit of weight 0 is indicated by a syndrome signal in which $IS_1$, $IS_2$, $IS_3$ are therefore connected to the inputs of AND 150 which provides a logic level 1 output to indicate an error in the lower weight bit.

Similarly, inputs $IS_1$, $IS_2$, $IS_4$ are connected to the inputs of AND 151 which provides a logic level 1 output to indicate an error in the bit of weight 1. Similar rules, expressed by the table of FIG. 3B apply to the connections between the IS lines and the inputs of the other ANDs 152, 153, 154, 155, 156, 157 which provide outputs of logic level 1 to indicate errors occurring respectively in the 2nd, 3rd, 4th, 5th, and 7th order bits. The outputs of the respective ANDs 150-157 are connected to the inputs of XORs 166, 167, 168 . . . 173. Each XOR receives at the second input, through channel 56 and inputs 57, the eight data bits referenced 0, 1, 2, 3, 4, 5, 6, 7 respectively to be corrected or to be transferred unmodified.

The correction operation consists of an inversion of the logic value and it is carried out by the exclusive OR's 166-173. The outputs of the XORs 166-173 provide the correct information and are connected to the outputs 67 of the correction network 22.

Figure 6:
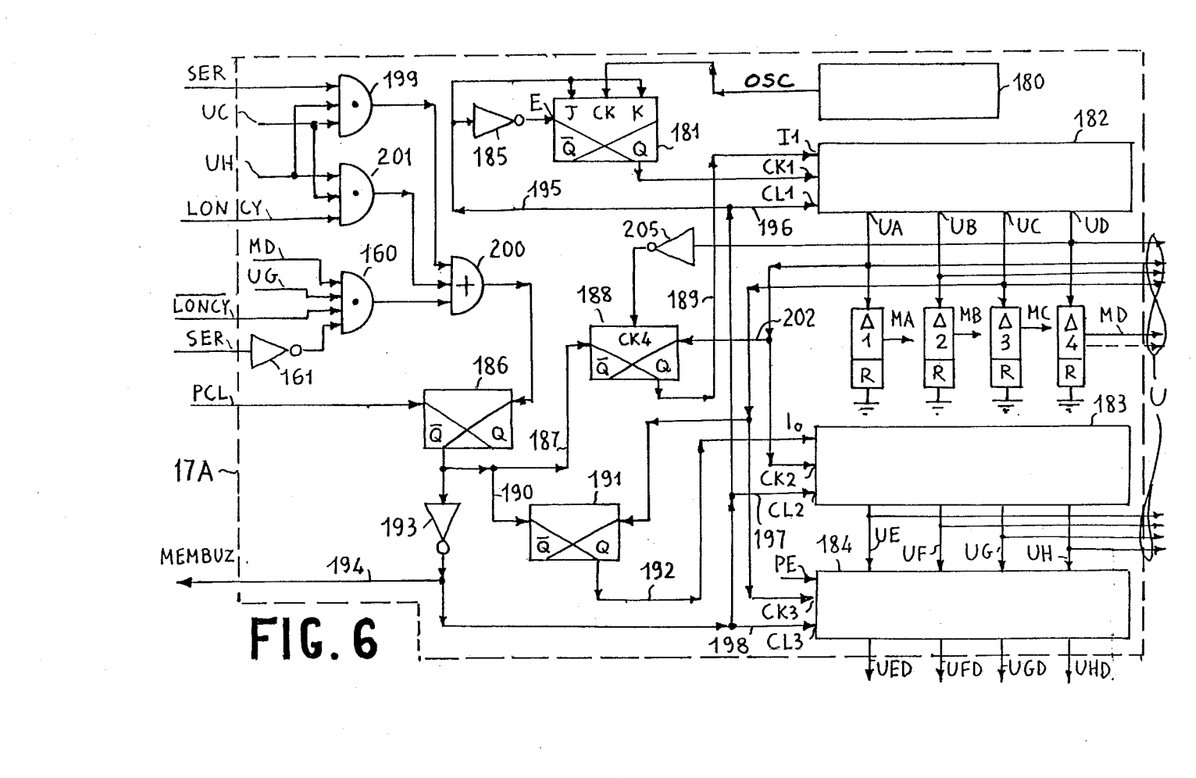
FIG. 6 is a diagram showing in detail the circuits of the timing unit 17A shown in FIG. 1.

The control unit 17 and the timing unit 17A will now be considered. FIG. 6 shows the timing unit 17A. The unit includes a crystal quartz oscillator 180 which generates a clock signal equal to, for example 57.15 MHz, i.e., each clock pulse has a period of 17.5 nsec. The clock pulses are sent to the CK input of a JK flip-flop 181, e.g., the type commercially marketed by Texas Instruments Inc. as catalog item 74S112.

When flip-flop 181 receives logic level 1 signals on inputs J and K and the E set input is at logical level 0, it changes its state with the first-occurring trailing (negative-going) edge of the clock input. At the Q output a sequence of 17.5 nsec. pulses, occurring at a repetition period of 35 nsec., appears. The Q output of flip-flop 181 is connected to the CK1 input of a shift register 182, which may be, for example, the Texas Instruments component designated by item number 74S195A. This unit is a four cell register having a serial input, designated $I_1$, four parallel outputs designated UA, UB, UC, UD, four parallel inputs (not used and therefore not shown), and a CL1 reset input. When the CL1 input is at logic level 1, the binary information present at input $I_1$ is loaded with the trailing edge of the $CK_1$ clock input into the first cell of the register and then appears at the UA output. At the same time, the binary information present in the register cells is shifted to the right by one cell, that is, it passes from the UA output to the UB output, etc.

Outputs UA, UB, UC, and UD, are respectively connected to the inputs of the four delay lines $\Delta_1$, $\Delta_2$, $\Delta_3$, $\Delta_4$, provided with intermediate output taps designated MA, MB, MC, MD. The outputs of the delay lines are grounded through a resistance of appropriate value. The UA output is further connected to the CK2 clock input of a second shift register 183 and the UC output is further connected to the CK3 clock input of a third shift register 184. Registers 183 and 184 may be of the same type as register 182.

The parallel outputs of register 183, designated UE, UF, UG, UH, are connected to the parallel inputs of register 184. Parallel loading of register 184 is controlled by the PE parallel load enable input permanently held at logic level "1." Both register 183 and register 184 are enabled to operate by a logic level 1 signal applied to the reset inputs CL2 and CL3 respectively.

The remaining elements of the timing unit include an arrangement of gates and flip-flops which provide start/stop control. The PCL signal, received from the interface I/O bus 2, controls initiation of a memory cycle and is applied to the set input of a flip-flop 186. The Q output of flip-flop 186 is connected through line 187 to the set input of flip-flop 188 which is of the JK type, like flip-flop 181. The Q output of flip-flop 186 is also applied through line 190 to the set input of R-S type flip-flop 191. Therefore, when flip-flop 186 is reset, flip-flops 188 and 191 are set. The Q output of flip-flop 188 is connected through line 189 to the I1 input of register 182 and applied thereto a signal at logic level 1 when flip-flop 188 is in set state. The reset input of flip-flop 188 is connected to the UA output of register 182 through line 202 such that the UA output pulse resets flip-flop 188. Flip-flop 188 in addition to being set by a pulse applied to the set input, is also set by the trailing (negative-going) edge of the clock pulse applied to the CK4 clock input.

The UD output of register 182 is connected to the input of inverter 205 whose output is connected to the CK4 clock input to flip-flop 188. When a level 1 pulse appears at the UD output, flip-flop 188 is then reset. The Q output of flip-flop 191 is connected through line 192 to the $I_o$ serial input of register 183. The Q output of flip-flop 186 is connected also to the input of inverter 193 whose output is connected to line 194, which transmits the memory busy MEMBUZ signal to bus 2, and to leads 196, 197, 198 used for transferring an enabling signal to the enabling inputs CL1, CL2, and CL3 of registers 182, 183, 184, respectively. The output of inverter 193 is also connected to lead 195 which, when flip-flop 186 is set, applies a logic level 1 signal to the JK inputs of flip-flop 181 and through inverter 185 applies a logic level 0 to the E set input of the same flip-flop.

Therefore when flip-flop 186 is set by the PCL signal, the set signal is removed from the inputs of flip-flops 191, 181, and 188, which however remain in a set state, and registers 182, 183, 184 are enabled. The reset operation of flip-flop 186 is controlled by various signals which control the modification of the duration of the timing cycle depending on the various requirements of the system.

For purposes of describing the present invention it is sufficient to state that three different timing cycles may occur: (1) a "short cycle" is a read cycle during which no single bit error correction is effected; it is characterized by the $\overline{\text{LONCY}}$ signal being true; (2) a "long cycle" is a read cycle during which the correction of an error is planned from the begining; this cycle is characterized by the LONCY signal being true; and (3) a "modified cycle" is commenced as a short read cycle but at the end thereof a single bit error is detected, whereupon the cycle is lengthened to allow storing of a bit in auxiliary memory 27 indicating the presence of a single bit error. A modified cycle is characterized by the generation of the SER signal at a time prior to the time the short cycle would normally end.

It should be noted that such cycles occur during memory read commands. Other commands, e.g., write commands, error register read commands, read/write diagnostic commands, may generally require different timing cycles. In the described embodiment it will be assumed for the sake of simplicity that the latter commands can be executed with a short timing cycle.

The network formed by ANDs 199, 201, 160, OR 200, and inverter 161 determines the length of the timing cycles. In the case of a short cycle the simultaneous presence of LONCY and SER (the latter obtained by inverting the SER signal through inverter 161), and of two timing pulses designated MD and UG at the inputs of AND 160, provides a logic level 1 at the output of AND 160, which is connected to an input of OR 200. The output of OR 200 operates to reset flip-flop 186.

In the case of a long cycle, the simultaneous presence of the signal LONCY and of the two timing pulses UH and UC at the inputs of AND 201 causes a logic level 1 to appear at the output thereof, which output is also connected to an input of OR 200 and causes the latter to reset flip-flop 186.

In the case of a short cycle during which a single bit error is detected, the simultaneous presence of SER and of the two timing pulses UH and UC at the inputs of AND 199 causes a logic level 1 to appear at the output of AND 199, which also causes OR 200 to reset flip-flop 186. The timing pulses MD, UH, UC, and UG are generated by the previously described circuits of the timing unit. The SER signal is generated by the previously described network 21 and the LONCY, $\overline{\text{LONCY}}$ signals are generated by the control unit circuits described subsequently.

The operation of the timing unit 17A is hereinafter described with reference to both FIG. 6 and to the timing diagram of FIG. 7, in which the signals present at different points of the unit are illustrated. The free running oscillator 180 provides a continuous train of OSC pulses but the memory is not activated until the PCL signal is received. PCL sets flip-flop 186 which during its preceding resetting operation had set flip-flops 191 and 188. Therefore a logic level 1 signal is being applied to inputs $I_1$ and $I_0$ of the two shift registers 182 and 183 (see $I_0$ and $I_1$ in FIG. 7) and the MEMBUZ memory busy signal is generated.

Figure 7:
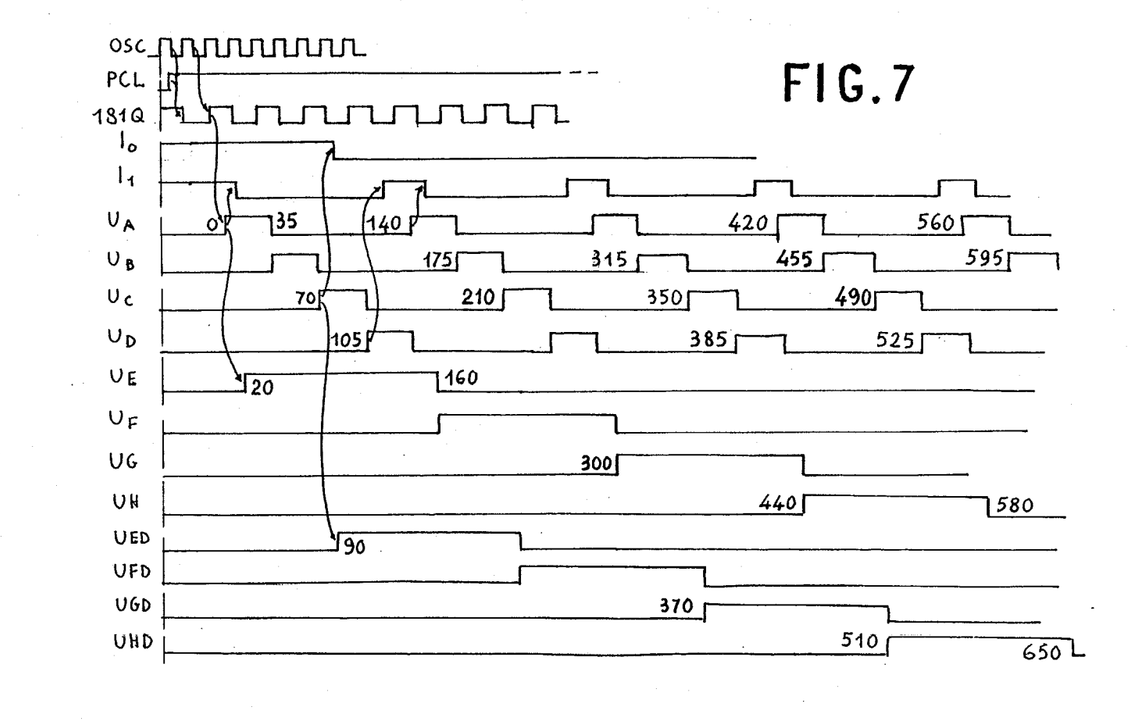
FIG. 7 is a timing diagram illustrating the various timing signals generated by the timing unit of FIG. 6.

In FIG. 7 the waveforms shown take into account the propagation delays of the various elements. At the same time that flip-flop 186 is set, flip-flop 181 and registers 182, 183, and 184 are enabled. Flip-flop 181 starts switching with a period of 35 nsec. to generate the wavetrain 181Q shown in FIG. 7 which triggers operation of shift register 182. At the UA output of registor 182 a pulse of 35 nsec. duration is generated which resets flip-flop 188. Therefore the signal applied to input $I_1$ goes back to logic level 0. The pulse present at output UA also triggers register 183 whose input $I_0$ is at logic level 1. At output UE of register 183 a pulse is generated having a duration dependent on the time interval between two subsequent triggering pulses at output UA (i.e., as it will be seen, 140 ns.).

35 nsec. after the generation of the UA pulse, register 182 receives from flip-flop 181 another triggering signal. Since input $I_1$ is at the time at logic level 0, output UA switches to logic level 0, whereupon output UB shifts to logic level 1. Similarly, after a further 35 ns. output UB is switched to logic level 0 and output UC rises to logic level 1 and after a further 35 ns. output UC drops to logic level 0 and output UD shifts to logic level 1. At this point flip-flop 188 is again set. For this reason, 140 ns. after a logic level 1 pulse has appeared on output UA, the same output is set again to logic level 1 and register 183 receives a new triggering signal.

To sum up, 35 ns. pulses appear in succession for a period of 140 nsec. at the outputs UA, UB, UC, and UD while pulses of 110 ns. duration appear in succession at outputs UE, UF, UG, and UH. Outputs UED-UHD of register 184, which is activated by UC pulses from register 182 to load in aparllel the information present at outputs UE-UH of register 183, repeat, with a 70 ns. delay, the pulses generated by register 183. Similarly, the various intermediate taps MA-MD of the delay lines 1, 2, 3, and 4 repeat the pulses generated at outputs UA-UD with a delay which depends on the delay line characteristics and the tap position.

All the above-mentioned timing outputs are supplied by the timing unit through lines generically indicated with "U" (FIG. 1). It is therefore clear that by performing AND and OR logic operations with the various available timing pulses, timing and control signals beginning and ending exactly at required times can be obtained. It is also possible to modify the length of the timing pulses as a function of events that are detected during such timing pulses, by lengthening or shortening such pulses and, if necessary, by stopping the complete memory cycle with an extremely short recovery time.

In fact it should be noted that a very short timing pulse resets the various flip-flop and network registers with a reset time of a few nanoseconds, whereupon the only elements which remain active after that reset pulse are the delay lines which have a very short characteristic delay time equal or less than 35 nsec. Therefore any time the timing unit operation has to be stopped, this can be obtained in a period that is the worst case for the present embodiment is about 35–40 nsec.

The waveform diagram of FIG. 7 takes into account the approximate intrinsic propagation delays of the signals through the various components. The numbers shown near each waveform edge expressed in nanoseconds, indicate the delay of each edge relative to the leading edge of the first UA pulse, which starts a memory cycle and is taken as the "0" time reference. An understanding of these delays is useful to correlate the behavior of the control unit with the timing unit and to describe time sequence of events of the memory operation.

Furthermore, in the following description for the sake of simplicity, when a timing pulse is applied to the input of a logic circuit, said signal and the input to which it is applied will be designated with reference to the output of the timing unit generating said signal, omitting reference to the various connecting lines and ancillary signals which are not essential for an understanding of the basic operation being described.

At this point it is possible to examine in detail the control unit 17, which for clarity can be divided into the blocks shown in FIGS. 8, 9, 10A, 10B, and 10C. The control unit has to control the running of the memory as a function of the commands received by the decoder 16 and of the possible conditions that may arise in the memory itself. For simplicity the assumption will be made that the control unit receives from decoder 16 only four mutually exclusive types of commands: (1) a read command defined by an RM signal (READ MEMORY) at logic level 1; (2) a write command defined by the WM (WRITE MEMORY) signal at logic level 1; (3) an error register read command, defined by the RER signal (READ ERROR REGISTER) at logic level 1; and (4) a write diagnostic command defined by a WD signal (WRITE DIAGNOSTIC) to store in the auxiliary memory 27 an information bit of appropriate value. Other types of commands, provided to execute combined write/read operations and diagnostic operations are not considered here since they are not essential for the understanding of the present invention.

Figure 8:
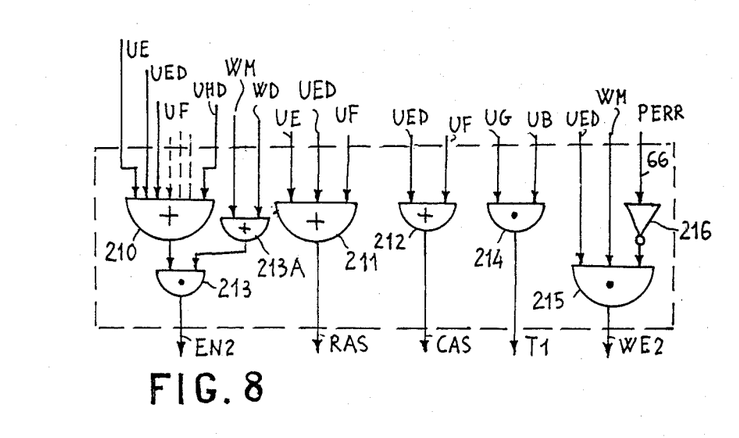
FIGS. 8, 9, 10A, 10B, and 10C are additional circuit schematics showing various logic blocks used in the memory system control unit.

FIG. 8 shows the portion of the control unit which controls the input data and handles the read/write operations of the memory module. The circuitry of FIG. 8 includes OR gates 210, 211, 212, 213A, AND gates 213, 214, 215, and an inverter 216. OR circuit 210 receives at its inputs all the timing pulses UE, UED, UF, UFD, UG, UGD, UH, and UHD and generates a continuous enabling signal, which, in practice, starts at the beginning of the memory cycle and stops at the end of the cycle. Such signal is transferred through AND 213 when it is enabled either by the WM signal or by the WD signal both received from decoder 16 through OR 213A. The output EN 2 from AND 213 indicates that the cycle being run is a write cycle, either normal or diagnostic and is used as an enabling signal for the parity control network 15.

Keeping in mind the propagation delays of the circuitry, EN2 comes up with a delay of approximately 30-40 ns. following the first UA pulse, that is, with a delay that will guarantee that the information at the input to the parity check network 15 is in a stable state. At the same time EN2 appears early enough to permit to a parity error detection output PERR to propagate through output 42 and line 66 to the control circuit of in FIG. 8 before the same circuit receives the UED timing pulse. In fact, FIG. 8 shows that the UED pulse is used, in the presence of a WM signal and in the absence of PERR to generate the timing command WE2. This operation is carried out by AND 215 together with circuit inverter 216.

The choice of the UED pulse for this control function depends essentially on the characteristics of the memory used, which in the present embodiment requires the imposition of a delay of approximately 70 ns. On the WE2 signal relative to RAS signal, which has a duration of 140 ns. It is therefore clear that in the case of a parity error detected in the input data to be written, the write operation will not take place since the necessary WE2 command is inhibited by the PERR signal.

OR 211 generates the RAS command by logically summing the timing pulses UE, UED, and UF applied to its inputs. RAS has a duration of 280 ns. and is generated with a delay of approximately 25-30 ns. after the first UA pulse.

Similarly, OR gate 212 generates the CAS control signal by ORing the UED and UF pulses. CAS is a 210 ns. signal which starts with a delay approximately of 90 ns. relative to the first UA pulse.

AND 214 generates the loading pulse T1 for output register 20 as the logical product of pulses UG and UB. The pulse T1 is a 35 ns. pulse which starts with a delay of approximately 315 ns. relative to the first UA pulse. The selecting signal used to switch the multiplexer 90 (FIGS. 1 and 2) is the same UED pulse. To conclude the description of the circuit of FIG. 8, it will be pointed out that the RAS, CAS, and T1 signals are generated in every memory cycle, whereas EN2 and WE2 are generated for read cycles only.

Figure 9:
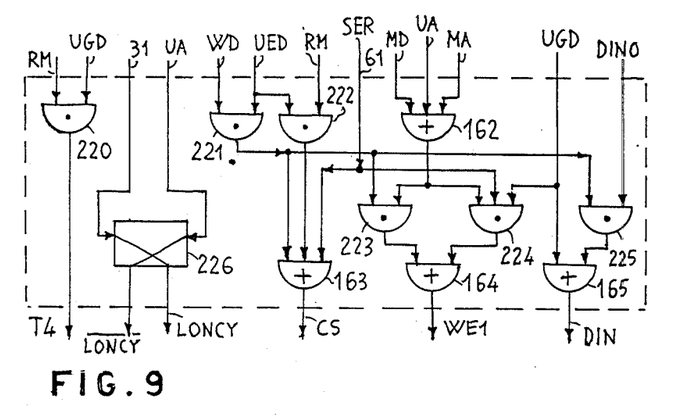

FIG. 9 shows another portion of the control unit 17 which controls the operation of the syndrome generation network 21, the auxiliary memory or error "directory" 27, and the memory cycle length. The circuits of FIG. 9 include AND gates 220, 221, 222, 223, 224, and 225, OR gates 162, 163, 164, and 165, and flip-flop 226. AND 220 generates the timing signal T4 on receipt of the RM input signal and the UGB timing pulse. The RM signal, received by the decoder 16, indicates that the memory cycle being run is a read cycle. UGD provides a timing pulse generated by the FIG. 6 timing circuits.

Taking into account the delay of the circuit 224 (5-10 ns.) it is apparent from the FIG. 7 timing diagram that T4 is generated with a delay time of approximately 375-380 ns. from the first UA pulse and at this time it enables the error output of the syndrome generation network 21. It is noted that the information to be checked for the presence or absence of error is available at the output of register 20 only at instant T1 increased by the transfer time of register 20, i.e., at a time which is about 330 nanosecond after the first UA pulse. The syndrome generation network 21 introduces a further delay of about 45-50 ns. before the syndrome signal becomes available at the output 58. Therefore, enabling signal T4 arrives when the outputs of network 21 are in stable state as a function of the signals received at its input, that is with a delay of approximately 375-380 nanoseconds in respect of the first UA pulse.

Outputs 61 and 62 of network 21 (FIG. 4) are therefore enabled starting from this point (plus the propagation time of circuits 142 and 143, which is about 5-10 nanoseconds and remain energized for the remaining part of the cycle which in after approximately 110 nanoseconds in response to the UGD pulse. In the case of a single or multiple error either the SER or MER signal appears at outputs 61, 62 respectively. Flip-flop 226 (FIG. 9) is used to define the length of the read cycle depending on the presence or absence of single errors which have already been detected in the selected memory module area in which the read operation is performed.

At the beginning of the read cycle, flip-flop 226 if not already reset, is reset by the UA pulse. This switches the LONCY output to logic level 1 and indicates that the cycle being run is a short cycle. During the first phase of the read cycle, in parallel with the addressing and reading of memory module 18, the auxiliary memory 27 is addressed and read out. The memory 27 is faster than module 18, so that the information on output on line 31 is made available before the information on output lines 43 from module 18 and appears after a delay of approximately 140 nanoseconds from the first UA pulse.

If the information read from memory 27 is at logic level 1, that means that in the addressed memory module zone at least one memory location is affected by a single bit error and, therefore, the readout information must be checked and corrected. These operations require a long memory cycle. The signal received on line 31 then resets flip-flop 226 whereupon LONCY rises to logic level 1 and $\overline{\text{LONCY}}$ falls to logic level 0. As already seen, signals LONCY and $\overline{\text{LONCY}}$ are sent to timing unit 17A and define, according to their state, the cycle length. In addition, as it will be seen below, they are sent to other elements of the control unit and modify the start time or the length of other timing signals.

The network formed by the remaining gates of the FIG. 9 circuit controls the read/write operations of the auxiliary memory 27. Each read cycle of the auxiliary memory 27 is initiated by the CS read signal having a 140 ns. duration. This signal is obtained from the UED pulse when AND 222 is enabled by the RM command. The output from AND 222 is tranferred through OR circuit 163 to yield the CS output. The timing diagram of FIG. 7 shows that taking into account the propagation time of circuits 222 and 163, the CS signal starts approximately 100 nanosecond after the first UA pulse and continues for 140 nanoseconds.

40 ns. after the appearance of CS, the information read from memory 27 is made available at output 31. As previously mentioned the memory 27 may be of the type marketed by Fairchild as item 93L425. In addition, at the end of a short read cycle an updating, or write operation, in memory 27 must be carried out if the SER signal is generated indicative of a single bit read error, i.e. a "1" is to be written in the addressed memory location instead of the pre-existing "0".

This operation requires the generation of a new CS signal together with the write command WE1 suitably timed with respect to CS. The SER signal received on line 61 (FIG. 9) and transferred through OR 163 supplies the new CS signal which, considering the circuitry 385+380 ns. relative to the first UA pulse. The SER signal is also applied to an input of AND gate 224, which receives at its other two inputs the UGD timing signal and the output of OR 162 which responds to timing pulses MD, UA and MA. AND 224 generates through OR 164 the signal WE1 for the length and the time requested. The information being stored in the auxiliary memory is at logic level 1 which is supplied to the DIN input by the UGD signal, transferred through the OR circuit 165. It is clear that the logic level 1 is present at the DIN input for a time interval whose length includes the time interval during which the write command WE1 is present, in the case of a detected single error.

It may also be necessary to modify the contents of the auxiliary memory 27 by means of a WD command for diagnostic or reset purposes. AND gate 221 receives at its inputs the WD command as well as the UED timing pulse. The output of AND 221 is connected to an input of OR 163 and to an input of AND gates 223 and 225.

The output of OR 163 supplies the CS signal for the whole duration of the UED pulse in the presence of the WD command. For the same time interval AND 225 is enabled to transfer to its output a signal received via the DINO line, which is connected to one of the lines of data channel 36. The enabling of AND gate 223 transfers the signal present at the output of OR gate 162, which responds to pulses MD, UA, MA, and generates the appropriate write command WE1 through OR 164.

Figure 10A:
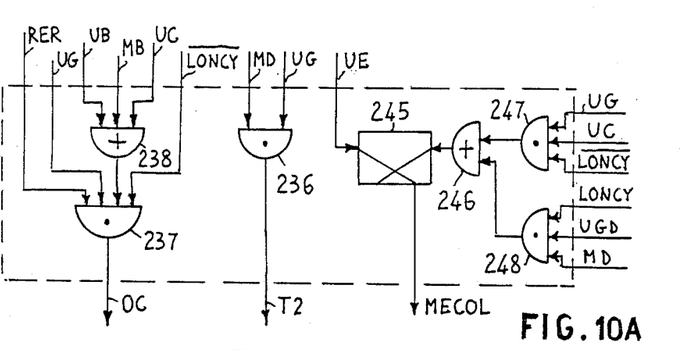
Figure 10B:
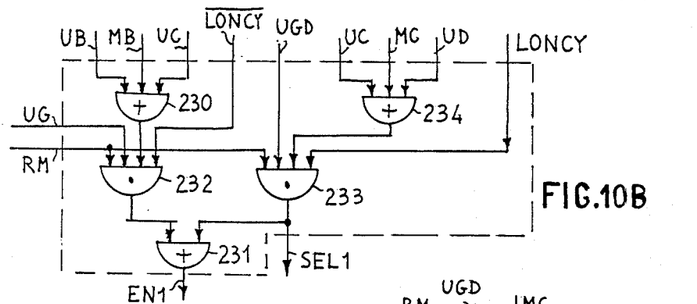
Figure 10C:
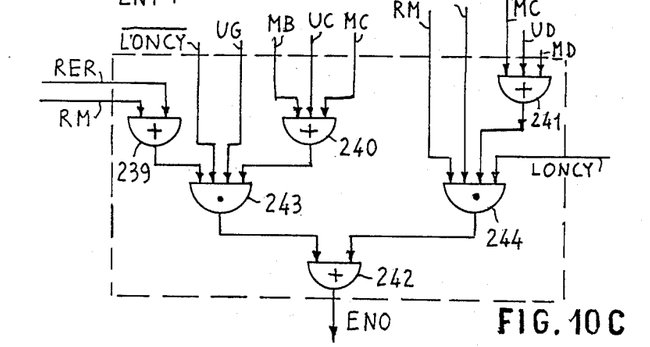

FIGS. 10A, 10B, and 10C show other blocks of the control unit 17 which control multiplexer 24, error register 25, driver circuits 10 and the signals read from the memory module for transfer to I/O bus 2. The circuits of FIGS. 10A, 10B, and 10C may be defined as output control circuits. For the control of multiplexer 24 two signals EN1 and SEL1 are required, the first ot enable the multiplexer output which in the absence of EM1 (with EM1 at logic level 0) would be in high impedance state, and the second signal to select inputs 53 or 68 in a mutually exclusive way. Signals EN1 and SEL1 are generated by the OR gates 230, 231, and 234 and by AND gates 232, 233.

OR 230 receives at its inputs the signals UB, MB, and UC and its output is connected to an input of AND gate 232. AND 232 receives at its inputs the signals RM, UC, $\overline{\text{LONCY}}$ and the output from OR 230. The output of AND 232 is connected to an input of the OR gate 231. Thus the output EN1 of OR 231 rises to logic level 1 in the case of short read cycles (RM at logic level 1, $\overline{\text{LONCY}}$ at logic level 1) at a time of about 330-340 ns. relative to UA (considering the propagation delay of gates 230, 232, 231) and for a duration of 70 ns.

AND 233 receives at its inputs the signals RM, LONCY, UGD, and the output from OR 234. OR gate 234 receives at its inputs the signals UC, MC, and UD. The output of AND gate 233 is connected to an input of OR 231. Therefore, the output of OR 231 rises to logic level 1, that is generates the EN1 signal, even in the case of a long read cycle, but with a delay relative to UA of approximately 385-395 ns. (considering the propagation times of circuits 234, 233, and 231), and for a duration of 70 ns.

As is apparent from the above, the signal EN1 is generated at different times depending on the cycle length. The output of AND 233 also supplies a SEL1 selecting signal which, shortly in advance of EN1, selects the multiplexer inputs 68 (FIG. 1), instead of the inputs 53.

To control the error register 25, two signals T2 and OC are required. T2 is used to enable the loading of the register while OC enables the register outputs that, absent OC would be in a high impedance state. The T2 pulse is generated by AND 236 which receives at its inputs the signals MD and UG. The T2 pulse has a duration of 35 ns. and occurs approximately 395 ns. following the first UA pulse. T2 is applied (FIG. 1) to an input of AND gate 1 and is transferred to its output when AND 1 is enabled by the general error signal GERR. GERR is generated, if during a memory cycle an error is detected, within a delay of 390 nanoseconds at the most relative to the first UA pulse (in the case of either a single or multiple error) preceding T2.

The output of AND 1 transfers T2 to the register 25 clock input. In order to enable the outputs of register 25 an OC pulse is applied to the control input. OC pulse is generated by the network formed by AND 237 and OR 238. OR 238 receives as its inputs the signals UB, MB, and UC. The output from OR 238 is applied to an input of AND 237, which receives at its other inputs the signals RER, UG, and $\overline{\text{LONCY}}$. The output of AND 237 thus supplies an enabling OC signal at logic level 1 only when the RER command is present and is at logic level 1 for a duration of 70 ns. OC commences, like EN1, with approximately 330-340 ns. following to the first UA pulse.

The control of drivers 10 requires an EN0 enabling signal at logic level 1 for the time interval during which the information available at the output of either the multiplexer 24 or register 25 is valid. EN0 is generated by the group of AND gates 243, 244 and OR gates 239, 240, 241 and 242 shown in FIG. 10C.

Lengthy descriptions of the connections existing between these logic elements are omitted since they are apparent from the drawing. It need only be pointed out that in the case of a short cycle ($\overline{\text{LONCY}}$ at logic level 1), and for read operations of the error register (RER at logic level 1), or for memory read operations (RM at logic level 1), EN0 is initiated approximately 350 ns. after the first UA pulse and it lasts for 70 ns. In the case of a long cycle (LONCY at logic level 1) during memory read operations (RM at logic level 1), EN0 commences approximately 400 ns. after the first US pulse and has a 70 ns. duration.

In order to advise the central processor via I/O bus 2 that the memory cycle has been activated and, at the same time to supply a timing or strobe signal for the information read out, or an indication that the memory cycle is ending in the case of write operations, a MECOL signal is supplied. This signal is generated by the network formed by flip-flop 245, AND gates 247, 248 and OR gate 246 (FIG. 10A). The Q output of flip-flop 245 is connected to output line 9 (FIG. 1) used to transfer the MECOL signal to the I/O bus. Flip-flop 245 is set by teh UE pulse and the Q output rises to logic level 1. The trailing edge of the Q output indicates, through bus 2, that the memory cycle has been activated and that the timing unit is operating.

In the case of a short cycle the simultaneous presence of signals UG, UC, and $\overline{\text{LONCY}}$ at the inputs of AND 247 causes a logic level 1 to appear to the output thereof. This output is transferred by OR 246 and resets flip-flop 245. Keeping in mind the propagation delays of the components, the signal returns to zero, in the case of a short cycle, at a time approximately 370-380 ns. after the first UA pulse.

In other words the MECOL trailing edge occurs within the time interval during which the readout information (data or error) is made available to bus 2 through drivers 10. In the case of a long cycle, the simultaneous presence of LONCY, UGD, and MD at the inputs to AND 248 causes the latter to apply a signal through OR 246 to reset flip-flop 245. MECOL returns to zero approximately 420-430 ns. after the first UA pulse, that is, the MECOL trailing edge occurs again within the time interval during which the readout information (corrected if needed) is made available to I/O bus 2.

As already seen, termination of the memory cycle is signalled by transfer to bus 2 of a signal indicating that the memory is no longer busy, i.e., by the trailing edge of MEMBUZ. Considering together FIG. 6 and the waveform diagram of FIG. 7, and taking into account the signal propagation time through the various components involved (from 5 to 10 ns. for each element), it is noted that MEMBUZ returns to zero about 430-440 ns. after the first UA pulse in the case of a short cycle and after a period of approximately 510-520 ns. in case of a long cycle.

Having described a perferred embodiment of a memory system having the capability of single error correction and variable cycle control, the manner in which such memory interacts with the central processor (CPU) of the data processing system is hereafter summarized. First of all at initialization time the CPU may test the operability of the memory by successively writing and reading appropriate test data into and out of every addressable memory position. In this way it is possible to set the auxiliary memory or directory 27 to a state that stores and indicates most, if not all, of the memory zones in which readout single bit errors have been detected. This test or presetting operation requires, even for a memory capacity of about one million words with a memory cycle of 1 msec., a period of only a few seconds.

Subsequently, instead of the pre-existent information stored for diagnostic purposes, it is possible to write into memory the various programs to be executed as well as the data to be processed. During the readout operations which follow, the logic flow of the system will differ depending on various alternatives. During the first phase of the read cycle a check is made, in the directory for single error conditions previously detected in the addressed memory zone. If an error indication is present, the read cycle is automatically lengthened, the readout data is transferred through the correction network, and any single bit error will be corrected.

Even though no single error signal is present in the directory, a general error signal could occur during memory operation, caused for instance by a multiple bit error. In this case the control unit will select, immediately or at the most appropriate subsequent time, a read command of the error register, and will test, through the reading of this register, the nature of the error which has occurred and will decide on the type of intervention to carry out.

In the case where no previously detected single errors are identified in the directory, the read operation is performed with a short cycle. If during such short cycle no error is detected the operation is ended within the short cycle. If however a single error is detected, a general error signal is generated, the error register is loaded and at the same time the cycle is lengthened in order to allow the writing into the directory of the error information.

If a double error is detected, the general error signal is generated, the error register is loaded but the length of the short cycle is not modified. Upon receipt of the general error signal, immediately or at an appropriate subsequent time, the CPU will forward an error register a read command and will test through the reading of said register the nature of the error which has occurred and will select the type of intervention required.

For example, in the case of a single bit error the intervention will be a "retry" or "reread" operation that will be performed according to a long memory cycle and will provide correction of the single error, since the directory has been previously updated. It is clear that this "retry" operation can be performed prior to the reading of the error register, and in this case if a single error occurs, the error will be corrected and the general error signal will not re-appear. However, it will appear again in the case of a multiple error, which cannot be corrected. The above consideration points out that the error register performs an auxiliary function in the system of the present invention and, in fact, if the system is operated according to the above described second mode, it is the outcome of the "retry" operation which discriminates the two possible forms of error which can occur during a readout operation and the error register need not be employed.

However, use of an error register is preferred because it can provide to the CPU more information than merely discrimination between the two forms of errors. For example, in the preferred embodiment which has been described, the whole syndrome signal is loaded into the error register and transferred to the CPU. By analysis of the syndrome signal, it is possible for the CPU to derive diagnostic information which may enable identification of the exact failures which occurred.

In addition to the syndrome signal it is possible to load into the error register the address of the memory location which gave rise to the error indication. This provides additional information and enables the CPU to perform a readout of the error register at any preferred time, e.g., at the end of a read operation consisting in a sequence of read cycles, as generally occurs.

In fact, it can be seen that in the example given, the error register content is not lost in the course of the following memory cycle (no reset is provided), but it is updated only to record new error signals which occur. The previously stored information is erased only when updating occurs. In the course of normal operations of a data processing system the probability that in the course of a read sequence operation a plurality of errors will be detected is statistically so remote that the risk of losing information is negligible.

It is further noted that if the length of the error register exceeds the memory output parallel bit structure, it is always possible to split the read operation of the error register into two or more read cycles or time intervals. It is therefore clear that the preferred embodiment described above has been simplified in some respects to better show the features of the invention. Many changes can be made to the described embodiment without departing from the scope of the invention which is defined by the appended claims.

We claim:

1. A data processing memory apparatus including a data storage module having a plurality of addressable locations for storing in each said location digital information and an error correcting code related to said digital information, comprising:

error detecting/correcting code generation means for generating a correcting code related to each digital information segment to be stored in said module, said correcting code being stored in said module with said related digital information segment;

error syndrome generation means receiving a digital information segment and the related correcting code read out from said module and for generating an error syndrome indication based thereon;

error correction means receiving the digital information segment read out from said module and the error syndrome indication related to said digital information segment and delivering a corrected digital information segment to an output of said memory apparatus;

a direct circuit path for bypassing said error correction means and for delivering the digital information segment read out from said module directly to said output of said memory apparatus;

an auxiliary memory having a plurality of auxiliary addressable locations, each of said auxiliary locations being related to at least one addressable location of said data storage module and storing an error or no error indication;

timing means generating timing pulses for timing read cycles of said data storage module having different durations; and control means for controlling readout operations from said data storage module at a selected location and readout operations from said auxiliary memory at the auxiliary location related to said selected location and for enabling in a mutually exclusive manner said error correction means or said direct circuit path to deliver the digital information segment read out from said selected location to said output, and for further controlling said timing means to generate timing pulses defining a readout cycle having a duration selected from different durations in response to the digital information read out from said auxiliary location.

2. A data processing memory apparatus as claimed in claim 1 wherein said error syndrome generation means comprises further signal generating means for generating a correctable error signal and a non-correctable error signal.

3. A data processing memory apparatus as claimed in claim 2 comprising further circuit means controlled by said control means for inhibiting generation of a correctable error signal by said signal generating means, when said control means enables said error correction means.

4. A data processing memory apparatus as claimed in claim 3 comprising further write control means for writing an error indication at the auxiliary location of said auxiliary memory related to a selected location whenever a read out operation at said selected location has caused said signal generating means to generate a correctable error signal.

5. A data processing memory apparatus as claimed in claim 4 further comprising an error register for storing, in said register, whenever an error signal occurs, the occuring error signal and the error syndrome indication generated concurrently with said error signal by said error syndrome generation means.

6. A data processing memory apparatus as claimed in claim 4 further comprising an error register for storing, in said register, whenever an error signal occurs, the occurring error signal and the error syndrome indication generated concurrently with said error signal, and for keeping stored said error signal and said error syndrome indication until a new error signal occurs.

* * * * *